(12) United States Patent
Cattaneo

(10) Patent No.: US 8,550,424 B2
(45) Date of Patent: Oct. 8, 2013

(54) CARTRIDGE INCLUDING AN ANTI-RAM DEVICE

(76) Inventor: Piero Cattaneo, Cavaglio d'Agogna (IT)

(*) Notice: Subject to any disclaimer, the term of this patent is extended or adjusted under 35 U.S.C. 154(b) by 387 days.

(21) Appl. No.: 12/658,665

(22) Filed: Feb. 9, 2010

(65) Prior Publication Data

US 2010/0229985 A1    Sep. 16, 2010

(30) Foreign Application Priority Data

Mar. 12, 2009   (IT) .............................. MI2009A0380

(51) Int. Cl.
 *F16K 31/12* (2006.01)
(52) U.S. Cl.
 USPC ............ 251/50; 251/53; 251/54; 137/625.17; 137/625.41
(58) Field of Classification Search
 USPC .................... 251/48, 50, 53, 54; 137/625.17, 137/625.41, 625.46
 See application file for complete search history.

(56) References Cited

U.S. PATENT DOCUMENTS

| | | | | |
|---|---|---|---|---|
| 4,157,099 A | * | 6/1979 | Delker et al. ............ | 137/625.17 |
| 4,327,771 A | * | 5/1982 | Nikolayczik .............. | 137/625.4 |
| 4,715,406 A | * | 12/1987 | Kress ........................ | 137/625.17 |
| 4,723,574 A | * | 2/1988 | Bergmann et al. ........ | 137/625.17 |
| 4,736,772 A | * | 4/1988 | Ostertag et al. .......... | 137/625.17 |
| 4,768,749 A | * | 9/1988 | Oberdorfer ..................... | 251/50 |
| 5,069,249 A | * | 12/1991 | Ostertag et al. ............ | 137/625.4 |
| 5,303,736 A | * | 4/1994 | Orlandi ..................... | 137/625.4 |
| 5,413,144 A | * | 5/1995 | Riis .......................... | 137/625.17 |
| 5,570,720 A | * | 11/1996 | Riis .......................... | 137/625.17 |
| 5,592,971 A | * | 1/1997 | Knapp ..................... | 137/625.41 |

FOREIGN PATENT DOCUMENTS

| | | | |
|---|---|---|---|
| DE | 3902246 A1 | * | 8/1990 |
| EP | 311573 A1 | * | 4/1989 |
| EP | 1072833 A1 | * | 1/2001 |
| EP | 1659323 A1 | * | 5/2006 |
| EP | 1659324 A1 | * | 5/2006 |
| JP | 10019144 A1 | * | 4/1998 |
| WO | WO 8803240 A1 | * | 5/1988 |

\* cited by examiner

*Primary Examiner* — John K Fristoe, Jr.
*Assistant Examiner* — Jessica Cahill
(74) *Attorney, Agent, or Firm* — Hedman & Costigan, P.C.; James V. Costigan; Kathleen A. Costigan

(57) ABSTRACT

A cartridge including an anti-ram device comprises a multiple braking mechanism, including at least two pistons housed in the cover/driver element of a top movable plate, on the sides of a milled ball seat of the faucet control rod.

7 Claims, 6 Drawing Sheets

CARTRIDGE INCLUDING AN ANTI-RAM
DEVICE

BACKGROUND OF THE INVENTION

The present invention relates to a cartridge including an anti-ram device.

In prior single-control lever faucets, the faucet flow-rate control devices conventionally comprise ceramics screw elements or single-control lever mixing cartridges which have a comparatively short driving stroke providing, in a regular use condition, a very quick closure of the faucet.

This feature is self-evident in the so-called "quick pitch" faucets, which, however, just because of their quick type of operation, and due to middle-high pressures in the water distributing system, are frequently subjected to an undesired phenomenon, the so-called ram-surge, generated in the water pipes and substantially consisting of a return pressure wave generated by an abrupt interruption of the water flow as the faucet is closed, and tending to reverse the water flow direction.

High water flow-rates and pressures can cause the ram-phenomenon as a faucet is quickly closed.

Since the water parameters are fixed features, it is possible, for overcoming the ram phenomenon, to only affect the faucet closure speed.

Among several attempts designed for overcoming the above ram problem in single control lever faucet cartridges, the most efficient is that of using a hydraulic piston, designed for sucking water as the faucet cartridge is opened and ejecting the sucked water during the faucet closure, thereby the faucet operator is compelled to slowdown the faucet movement to fit the designed preset faucet opening rate.

In this approach, a piston draws water from an inner cavity of the cartridge, to which are conveyed hot and cold water from the faucet inlets, during the opening movement, while ejecting said hot and cold water into the cartridge cavity during the faucet closure operation.

Even if the above mentioned approach, in use for several years, operates better than other prior methods, it is however affected by three main drawbacks.

At first, for providing a given resistance, the piston must have a very large cross-section and, accordingly, a correspondingly large size.

Moreover, because of its geometrical construction, the great length of the piston may cause disalignments and inclinations of the piston control rod which must be precisely mounted on the faucet middle-line.

The second drawback is that a comparatively high counter-force is generated in closing the faucet, which force is applied at a single point and on small surfaces.

The third drawback is that, because of wear and inevitable polluting materials, the faucet operating mechanism could abruptly stop to properly operate.

SUMMARY OF THE INVENTION

Accordingly, the aim of the present invention is to provide such a faucet cartridge including an anti-ram device adapted to overcome the above mentioned drawbacks affecting prior faucet cartridges.

Within the scope of the above mentioned aim, a main object of the invention is to provide such a faucet cartridge including a small size anti-ram device.

Yet another object of the present invention is to provide such a. faucet cartridge including a constructional strong and mechanically resistant anti-ram device.

Yet another object of the present invention is to provide such a faucet cartridge, the anti-ram device of which may be easily constructed also by using mechanical machining methods.

Yet another object of the present invention is to provide such a faucet cartridge, the anti-ram device of which is very reliable in operation even in the presence of water polluting particles, and for a long useful operating time.

Yet another object of the present invention is to provide such a faucet cartridge construction which can be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by a faucet cartridge including an anti-ram device, characterized in that said cartridge comprises a multiple braking mechanism, including at least two pistons housed in the cover/driver element of a top movable plate, on the sides of a milled ball seat of the faucet control rod.

The two pistons are advantageously arranged symmetrically parallel with respect to the faucet. central or middle line and their operation is a double effect one and identical for each of the two parallel mechanisms.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where.

DESCRIPTION OF THE PREFERRED EMBODIMENTS

Figure 1:
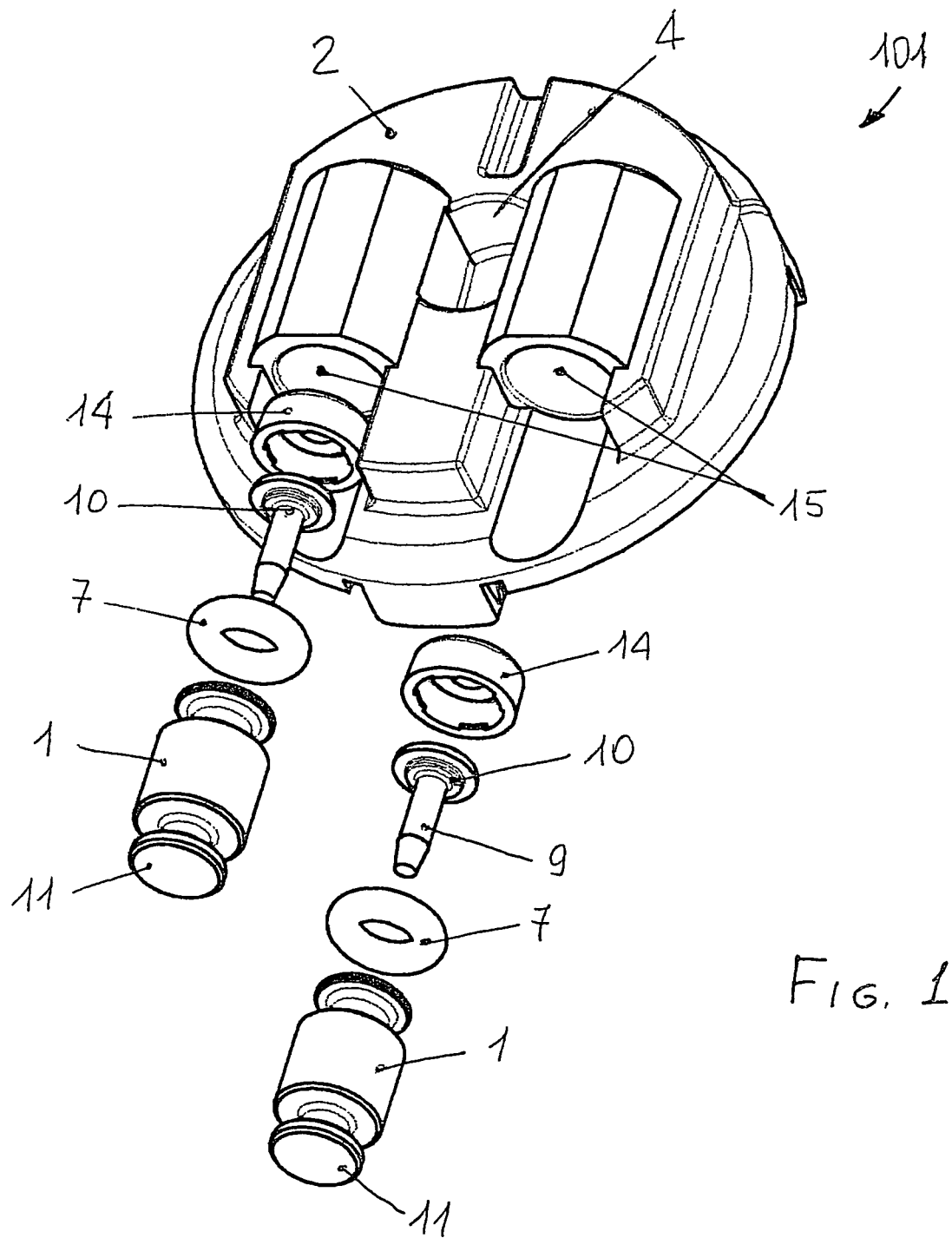
FIG. 1 is an exploded perspective view of the anti-ram device applied to .a faucet cartridge according to the present invention.
Figure 2:
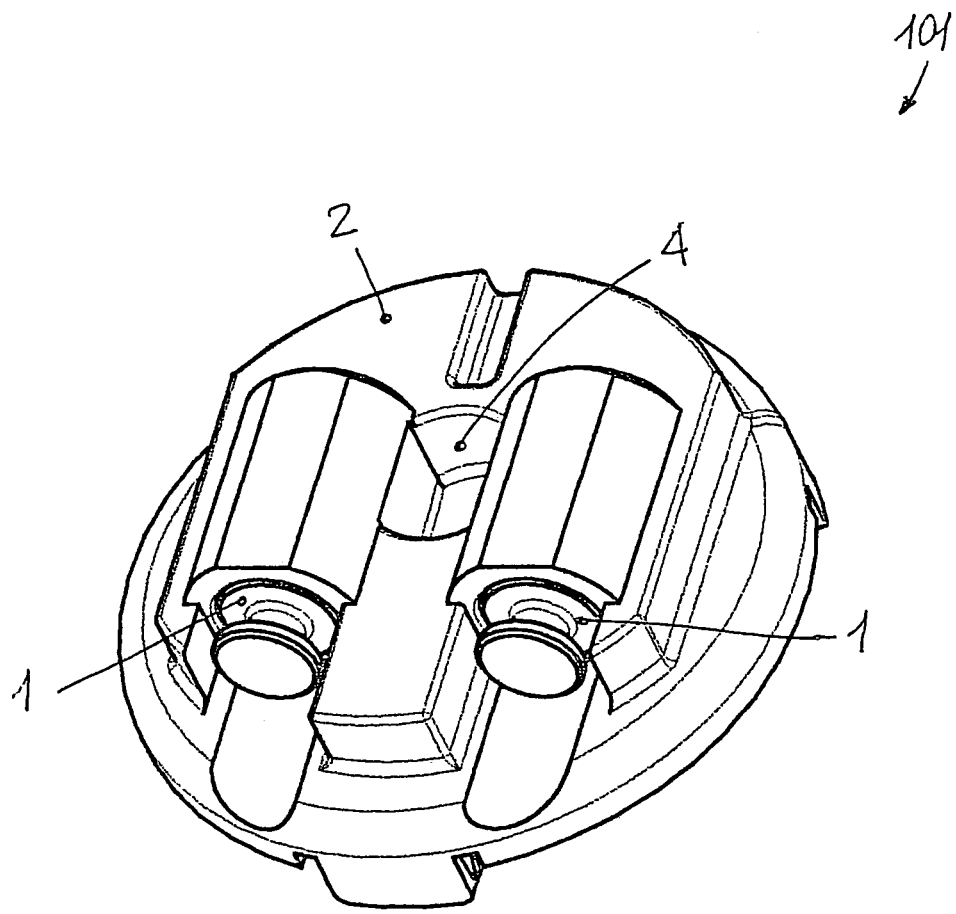
FIG. 2 is a further perspective view of the anti-ram device in an assembled condition thereof.

With reference to the number references of the above mentioned figures, the faucet cartridge according to the present invention, which has been generally indicated by the reference number 1, comprises a braking device 101, including a double-braking mechanism, with two pistons, generally indicated by the reference. number 1, which are arranged symmetrically parallel with respect to the faucet central-line.

More specifically, said pistons 1 are housed in a cover/driver element 2 of a top movable plate 3, on the sides of a milled ball seat 4 for a ball element 5 of the faucet control rod 6.

Each said piston 1 comprises a sealing gasket 7 and an axially extending hole 8 for guiding the stem 9 of a valve 10.

Each said piston 1 further comprises a collar 11 for engaging in a corresponding slot 12 formed in a support 13 of said rod 6, thereby providing a connection adapted to cause a reciprocating movement of the piston with respect to said cover/driver element during an opening/closing movement of the control lever.

Each said valve comprises a valve head which is engaged in a respective perforated cup shaped seat 14.

The cup seats 14 being arranged in cylinders 15 formed in the cover/driver element.

On the bottom of each cylinder is provided a small overflow tapering portion 16 communicating, through a communicating hole 17, with a water circulating chamber 20 of said cover/driver element.

Figure 3:
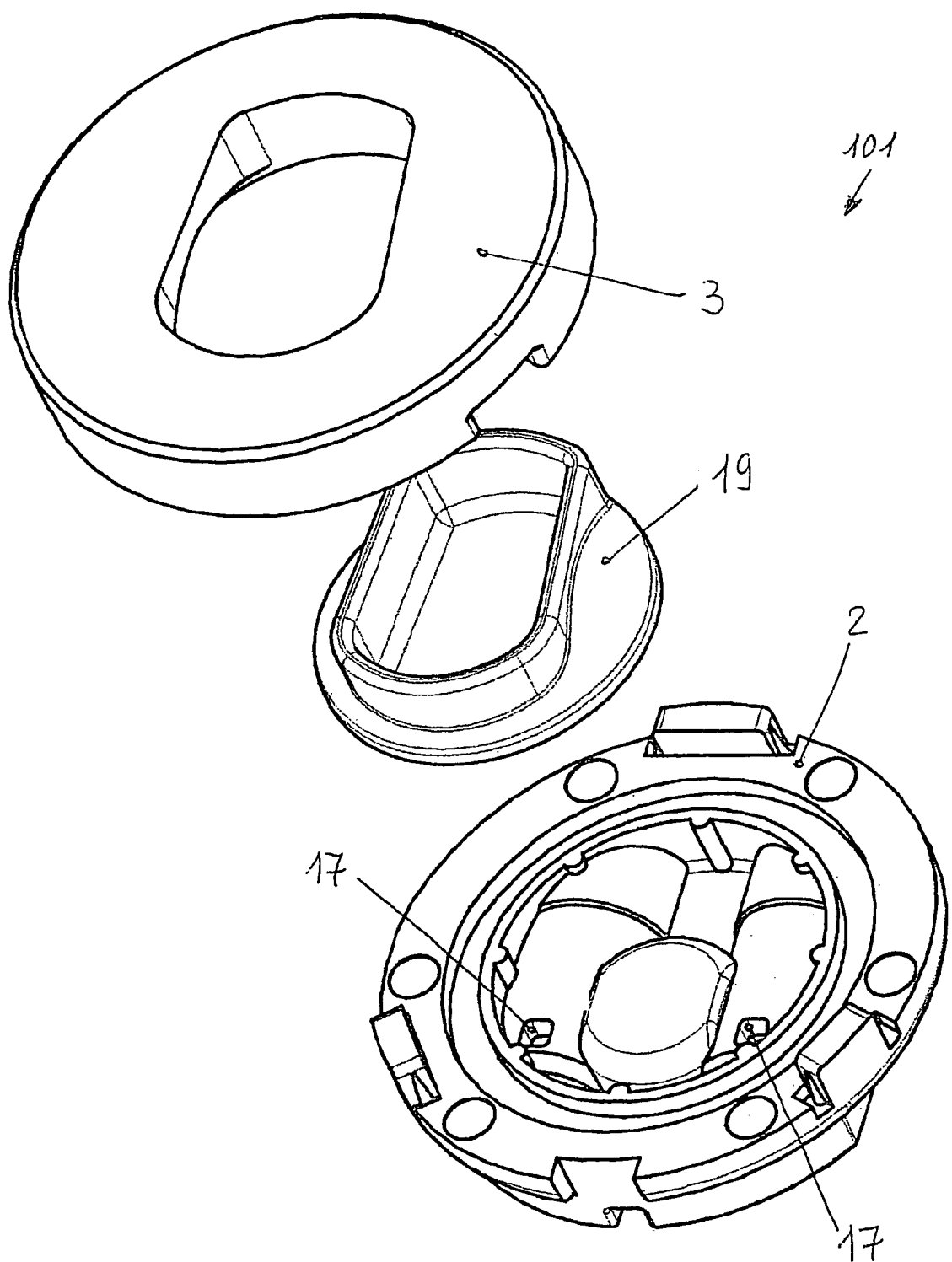
FIG. 3 is yet another exploded perspective view of a portion of the inventive device, opposite to the portion thereof shown in FIG. 1.
Figure 4:
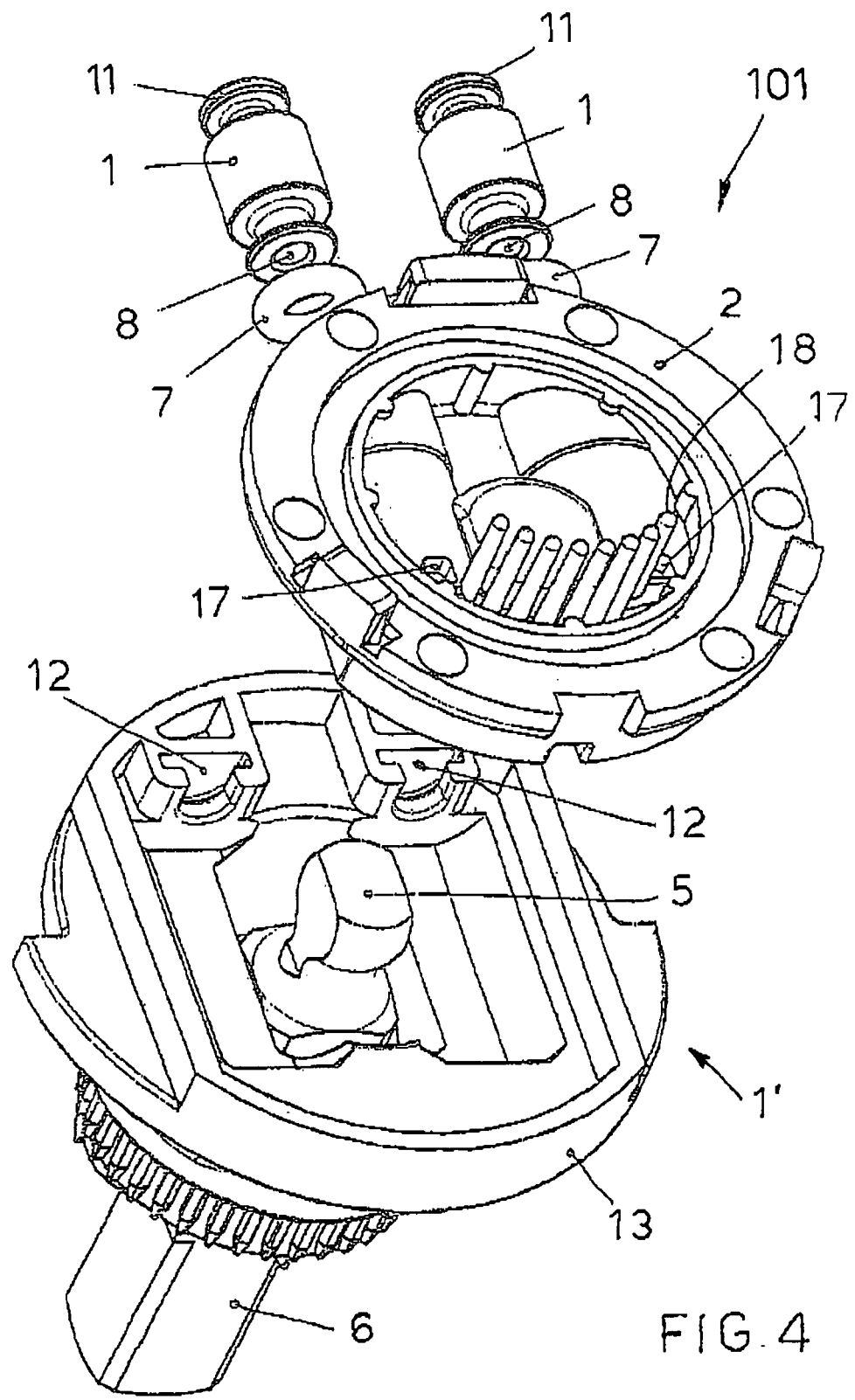
FIG. 4 is yet another exploded perspective view of the faucet cartridge and the anti-ram device according to the present invention.
Figure 5:
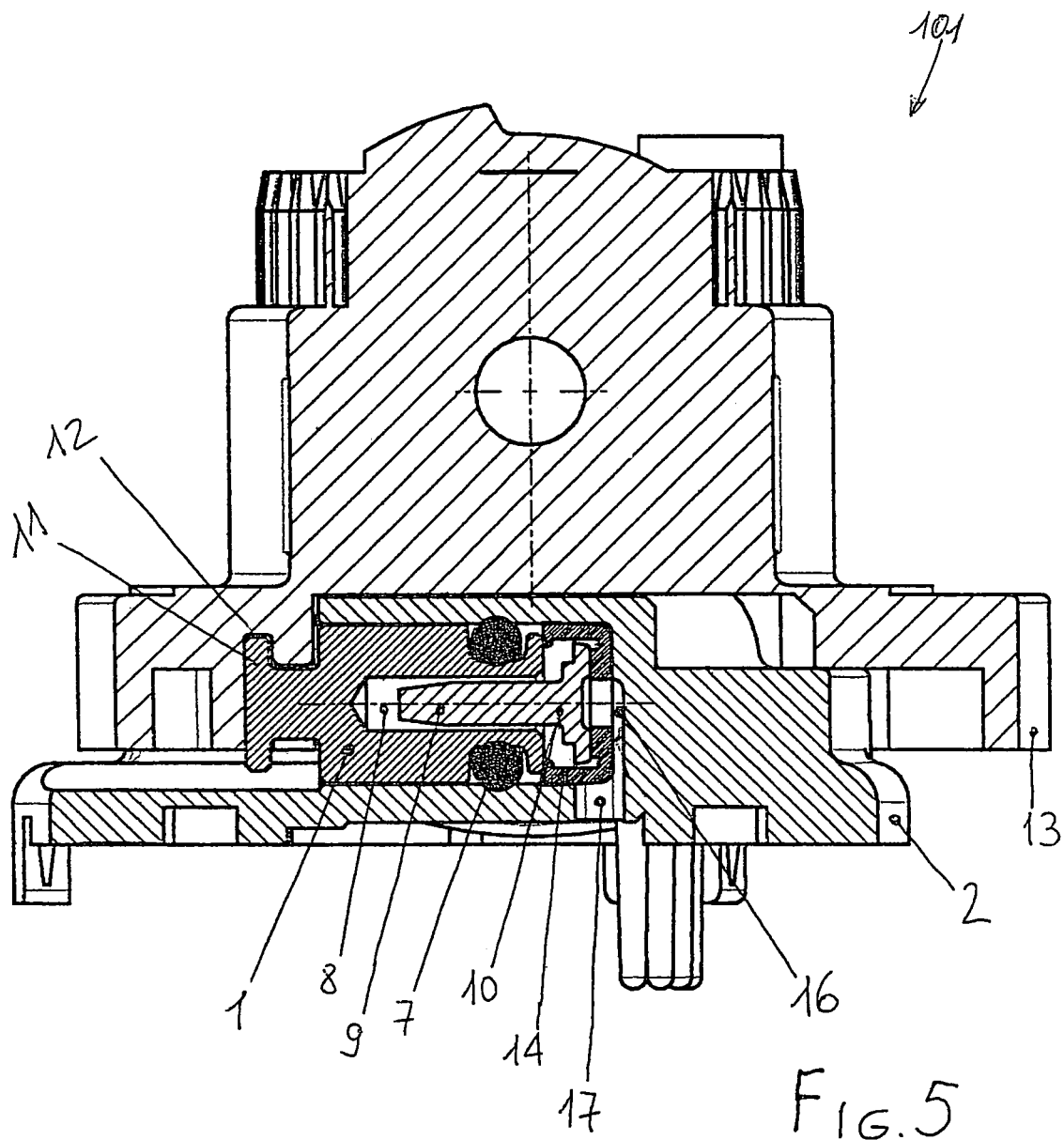
FIG. 5 is a cross sectional elevation view of the anti-ram device according to the invention.
Figure 6:
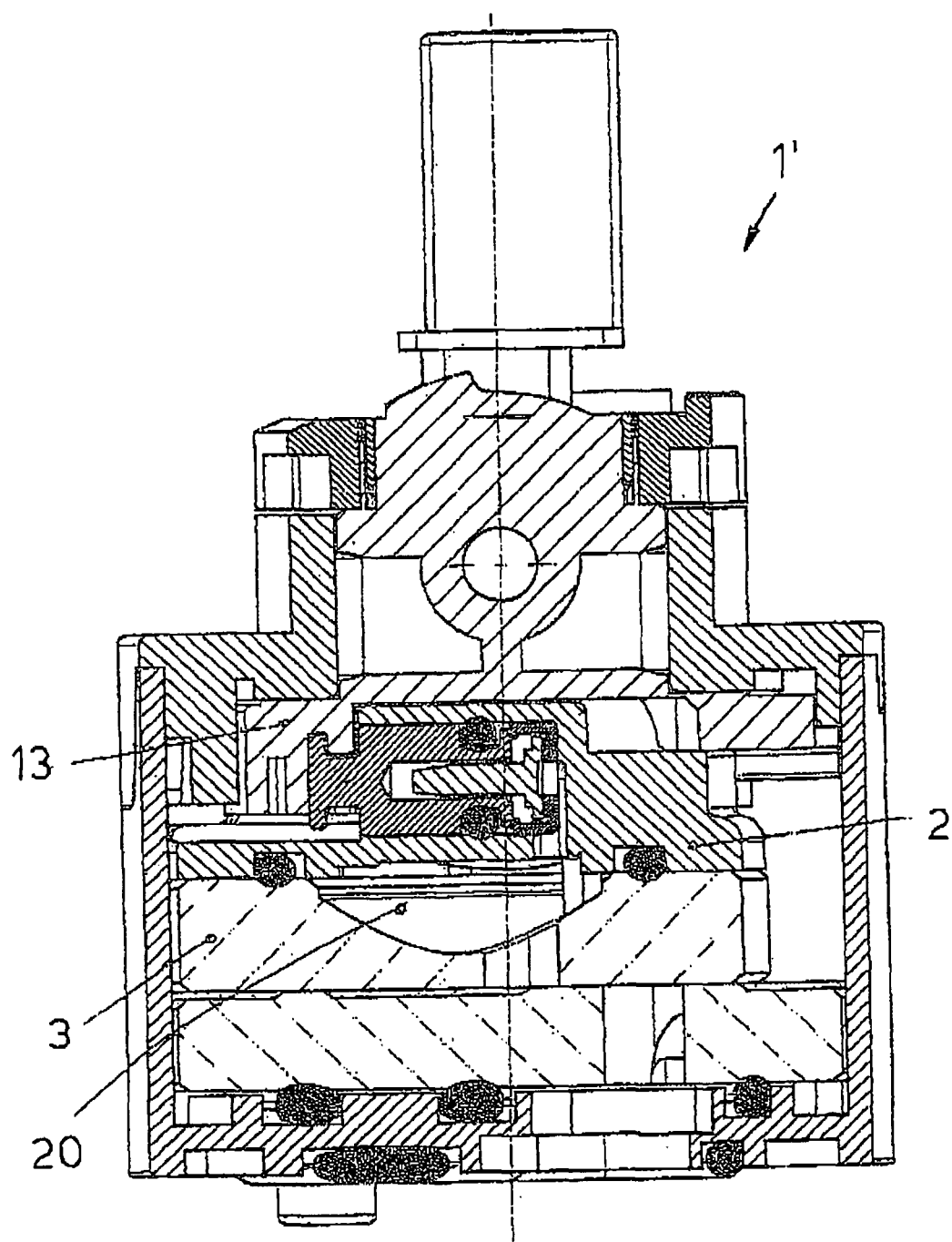
FIG. 6 is yet another cross-sectional elevation view of the cartridge and anti-ram device according to the present invention.

In particular, said cover/driver element may comprise a built-in anti-noise device including, for example, a plurality of pin or peg elements 18, as shown in FIG. 4; alternately, said cover/driver element does not comprise a built-in anti-noise device, the anti-noise function being provided by a contoured mesh arrangement 19 of the type shown in FIG. 3, which is also adapted to operate as a protecting filter for protecting the mechanism from small water impurities.

In operation, during the opening of the cartridge, water is sucked by the piston 1, which is forcibly displaced due to the latching of its end piece in the rod support slot, through said hole 17 communicating with said overflow arrangement tapering portion 16.

In such an operation, the valve is axially displaced in said seat, thereby allowing water to enter and fill in the chamber or space defined by the withdrawal of the piston.

During the faucet closing step, on the other hand, said valve is pressure displaced toward said seat, thereby shutting off the passage and hindering water from exiting said hole, to provide a water flow resistance producing the desired braking effect.

As stated, the above disclosed operation is a double one and being identical for each of the two parallel mechanisms.

It has been found that the invention fully achieves the intended aim and objects.

In fact, the invention has provided a faucet cartridge including a very small anti-ram device including two small pistons.

The two-piston device according to the present invention allows to substantially reduce to a half the forces applied on respective two latching points, (instead of one), thereby increasing the strength of the device while allowing it to be made of a less expensive material.

Differently from other prior constructions with a single piston arranged on the middle line of the cartridge and accordingly in axis with the control or drive ball, the inventive arrangement of the pistons symmetrically parallel to the control rod ball seat, prevents the control rod from being undesirably inclined, since it may be always held in a vertical closure condition; moreover, said control rod may also be easily made by simple mechanical machining operations.

Furthermore, the disclosed double braking system is a very reliable in operation even in the presence of water impurities.

Finally, even if a mechanism wears, the other will still provide a satisfactory braking operation.

In practicing the invention, the used materials, as well as the contingent size and shapes, can be any, according to requirements.

The invention claimed is:

1. A faucet cartridge including an anti-ram device, said cartridge comprising a multiple braking mechanism, including at least two pistons housed in a cover/driver element of a top movable plate, on the sides of a milled ball seat of a faucet control rod, characterized in that the at least two pistons are arranged in respective cylinders that are parallel to each other and symmetrical with respect to a faucet central line and with respect to said milled ball seat thereby preventing said faucet control rod from being inclined.

2. A faucet cartridge including an anti-ram device, according to claim 1, characterized in that each said piston comprises a sealing gasket and an axially extending hole for guiding a stem of a valve.

3. A faucet cartridge, according to claim 1, characterized in that said cover/driver element comprises a built-in anti-noise device, comprising pin, members.

4. A faucet cartridge, according to claim 1, characterized in that, as said cartridge is opened, water is sucked by one of said pistons which is forcibly displaced due to a latching of an end piece in a rod support slot by a hole communicating with an overflow arrangement; said valve being axially displaced in said seat, thereby allowing water to enter; during the closing step, said valve being displaced, due to the pressure, toward said seat, thereby hindering water from exiting the hole, to provide a resistance generating a target braking effect.

5. A faucet cartridge, according to claim 1, characterized in that each piston in each cylinder operates in an identical parallel manner.

6. A faucet cartridge, according to claim 1, each said piston comprising a piston collar for engaging in a corresponding slot formed in a support of the rod, thereby providing a connection adapted to cause a reciprocating movement of the piston with respect to said cover/driver element during an opening/closing movement of a lever, characterized in that said valve comprises a valve head engaged in a respective perforated cup shaped seat engaged in a respective cylinder formed in said cover/driver element.

7. A faucet cartridge including an anti-ram device, according to claim 6, characterized in that each said cylinder comprises a bottom cylinder including an overflow tapering portion communicating through a communicating hole with a water circulating chamber of said cover/driver element.

* * * * *